United States Patent
McIntyre et al.

(10) Patent No.: US 9,469,166 B2
(45) Date of Patent: Oct. 18, 2016

(54) APPARATUS AND METHOD FOR TIRE LOCALIZATION

(75) Inventors: Matthew D. McIntyre, New Baltimore, MI (US); Jean-Christophe Deniau, Fenton, MI (US); Brian Farrell, Troy, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 277 days.

(21) Appl. No.: 13/490,010

(22) Filed: Jun. 6, 2012

(65) Prior Publication Data

US 2013/0328674 A1 Dec. 12, 2013

(51) Int. Cl.
*B60C 23/00* (2006.01)
*B60C 23/04* (2006.01)

(52) U.S. Cl.
CPC ......... *B60C 23/007* (2013.01); *B60C 23/0416* (2013.01); *B60C 23/0488* (2013.01)

(58) Field of Classification Search
CPC ....... G01M 17/08; B50C 23/02; B60C 23/00
USPC ........... 340/442, 446, 447, 426.33; 702/150; 701/29
See application file for complete search history.

(56) References Cited

U.S. PATENT DOCUMENTS

| | | | |
|---|---|---|---|
| 7,010,968 B2* | 3/2006 | Stewart | B60C 23/0444 73/146 |
| 7,239,948 B2* | 7/2007 | Nimmo et al. | 701/36 |
| 8,380,460 B2* | 2/2013 | Miller | G01M 17/06 340/442 |
| 8,749,369 B2* | 6/2014 | Lee | B60C 23/0416 340/426.33 |
| 2003/0197603 A1* | 10/2003 | Stewart et al. | 340/442 |
| 2004/0257213 A1* | 12/2004 | Tsujita | 340/445 |
| 2006/0055524 A1* | 3/2006 | Okubo | 340/445 |
| 2006/0259214 A1* | 11/2006 | McQuade | B60C 23/0413 340/445 |
| 2008/0127723 A1* | 6/2008 | Lin | B60C 23/0416 73/146.4 |
| 2008/0161988 A1* | 7/2008 | Oesterling et al. | 701/29 |
| 2010/0109857 A1* | 5/2010 | Bennie | B60C 23/0408 340/447 |
| 2010/0127834 A1* | 5/2010 | Cobianu et al. | 340/10.1 |
| 2010/0148949 A1* | 6/2010 | McQuade et al. | 340/442 |
| 2012/0268263 A1* | 10/2012 | Lee et al. | 340/442 |

* cited by examiner

*Primary Examiner* — Daniel Previl

(57) ABSTRACT

Localization of a tire pressure monitor is achieved. The tire pressure monitor is disposed at one of the tires on a vehicle equipped with dualies. A message is received from a tire pressure monitor and the message has an associated received signal strength. The message includes information indicating a direction of rotation of a tire and a tire identifier from the tire pressure monitor sensor. The tire pressure monitor is disposed at one of the tires of a vehicle equipped with dualies.

20 Claims, 2 Drawing Sheets

APPARATUS AND METHOD FOR TIRE LOCALIZATION

TECHNICAL FIELD

This patent relates to tire pressure monitors and approaches for determining the location of these monitors.

BACKGROUND

On some passenger vehicles (e.g., cars and trucks), four tires are used. These include a front right tire, a front left tire, a rear right tire, and a rear left tire. However, with some vehicles, "dualies" are used. Dualies comprise two, separate tires that face each other and are typically used in the rear tire positions. Thus, if two dualies are used (each having two tires), the vehicle will have six tires.

The front face of any tire includes a tire rim and a front facing surface (often called the whitewall). With dualies, the first tire is first mounted on the axle in a position inner most to the vehicle. The front surface of this first tire is mounted closest to the vehicle and the rear surface is disposed so as to be furthest from the vehicle. Then, the second tire of the dualie arrangement is mounted on the axle and this tire is the outermost tire in the dualie arrangement. The rear surface of the second tire faces the rear surface of the first tire. The front surface of the second tire faces the exterior environment and is the outermost tire surface of the dualie arrangement.

Tire pressure monitors are now mandated on all passenger vehicles with a gross vehicle weight (GVW) less than 10000 pounds. A tire pressure monitor senses tire pressure and this pressure is often transmitted to a receiving unit in the vehicle. In some situations, when the tire pressure falls below a threshold, the user can be informed before problems (e.g., a flat tire) can occur with the tire.

In some cases, the receiver unit in the vehicle needs to know the identities of the tires and where these tires are located. Tires are often identified by identifiers (IDs). The process by which a particular ID (and hence tire) is associated with a specific position (e.g., front left, front right, and so forth) is known as a localization process.

Various types of localization processes have been used. Unfortunately, previous localization processes are not capable of determining the identities and positions of each of the two tires in dualie arrangements. As a result, user dissatisfaction with these approaches has resulted.

Figure 1:
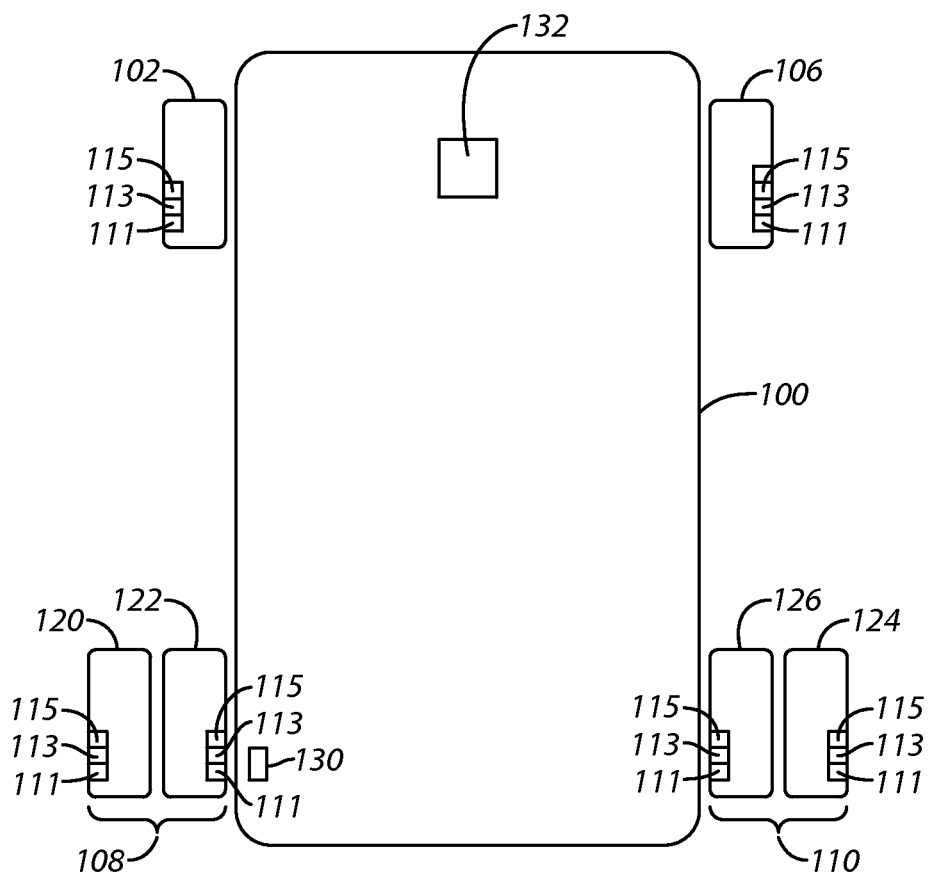
FIG. 1 comprises a diagram of a system for determining tire location according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the approaches described herein, both received signal strength (e.g., as measured according to a received signal strength indicator (RSSI)) and known tire rotation direction (e.g., clockwise or counterclockwise) are used to associate a particular tire ID with a particular tire position. And, more specifically a tire ID can be associated with a particular dualie position (left dualie, inner tire or left dualie, outer tire to mention two examples). The approaches described herein are easy and cost effective to use and implement, and accurate in determining the identity and location of particular tires in dualie arrangements.

As used herein, "localization" refers to the process of discovering where the tires are located (e.g., associating a tire identifier (ID) with a tire position). In one example, radio frequency (RF) messages are sent from tire monitors on a vehicle at predetermined intervals (e.g., every 16 or 32 seconds). In one aspect, the RF message sent from the tire monitor has a field indicating rotational direction. This rotational direction is, in one example, viewed from the perspective of the tire sensor.

In this respect and for dualies, one tire (e.g., the outermost tire) is mounted normally on the axle. The other tire (e.g., the innermost tire) is turned so that its whitewall (i.e., the front of the tire) faces (is closest to) the vehicle. The following applies to the tires of the left rear dualie. From the perspective of the TPM sensor on each of these tires, as the vehicle moves forward the outer tire rotates counterclockwise, and the inner tire of the dualie rotates clockwise. As for the right rear dualie (also having two tires), the inner tire rotates counterclockwise and the outer tire rotates clockwise. In some aspects, a wireless instigator (an LF transmitter) is disposed next to the rear left dualie.

As used herein, the received signal strength indicates the strength of a received signal. In one example, the received signal strength indicator (RSSI) is used as a relative measure of signal strength. In one aspect, a receiver that receives signals from monitors on the tires is mounted to the front of the vehicle. Consequently, the RSSI for signals received from the front tires will be relatively strong (e.g., a 10 level) while those received from the rear tires will be relatively weak (e.g., a 2 level). It will be appreciated that the numerical levels given herein are examples only and that other values are possible.

In many of these embodiments, the location of a tire pressure monitor is determined. The tire pressure monitor is disposed at one of the tires on a vehicle equipped with dualies. A message is received from the tire pressure monitor and the message has an associated received signal strength. The message also includes information indicating a direction of rotation of a tire and a tire identifier from the tire pressure monitor sensor.

A determination is made as to whether a wireless signal initiator has been activated and has transmitted an initiation signal. Based upon the received signal strength of the message, a determination is made as to whether the tire is a front tire or rear tire. When the tire is determined to be a front tire, a determination is made as to whether the tire is a left front tire or right front tire based upon the direction of rotation.

When the received signal strength indicates that the tire is a rear tire, based upon whether the initiator has been activated, a determination is made as to whether it is a tire of a left dualie or a tire in a right dualie. Then based upon direction of rotation, a determination is made as to whether the tire is an outer tire of the dualie or an inner tire of the respective dualie.

In some aspects, the initiator is a low frequency (LF) transmitter. In some aspects, the message comprises tire pressure information. In still other aspects, the tire pressure information is presented to a user. For instance, the information is presented on a graphical display. In other aspects, a determination is made as to whether the tire pressure is below a predetermined threshold.

In others of these embodiments, an apparatus that is configured to determine the location of a tire pressure monitor is provided. The tire pressure monitor is disposed at one of the tires on a vehicle equipped with dualies. The apparatus includes an interface and a controller.

The interface has an input and an output. The input is configured to receive a message from a tire pressure monitor. The message has an associated received signal strength and includes information indicating a direction of rotation of a tire and an tire identifier from a tire pressure monitor sensor.

The controller is coupled to the interface and is configured to determine whether a wireless signal initiator has been activated and has transmitted an initiation signal. The controller is configured to, based upon the received signal strength of the message, determine whether the tire is a front tire or rear tire, and when the tire is determined to be a front tire, to determine whether the tire is a left front tire or right front tire based upon the direction of rotation. The controller is further configured to when the received signal strength indicates that the tire is a rear tire, based upon whether the initiator has been activated, determine whether it is a tire of a left dualie or a tire in a right dualie. Then, based upon direction of rotation, a determination is made as to whether the tire is an outer tire of the dualie or an inner tire of the dualie.

It will be appreciated that any of the approaches described herein can be implemented as computer software instructions stored on computer usable medium or media, and executed by any type of processing device.

Referring now to FIG. 1, one example of a system for performing the localization process of tires of a dualie arrangement is described. The system includes a vehicle 100 and various tires as described herein. The tires include a front left tire 102, a front right tire 106, a left dualie 108, and a right dualie 110. The left dualie 108 includes an outer tire 120 and inner tire 122. The right dualie 110 includes an outer tire 124 and an inner tire 126.

Each of the above-mentioned tires includes a tire pressure sensor 113. The left dualie 108 has disposed near it an initiator 130. The initiator 130 may be a low frequency (LF) transmitter that transmits low frequency signals. These signals are received only by the monitors of the left dualie 108 and not the right dualie 110. Monitors 115 in each of the tires of dualie 108 respond to a received signal from the initiator 130 by transmitting an RF message (within a predetermined time period). Together, the pressure sensors 113 and monitor 115 form a tire pressure monitor (TPM) sensor.

Each tire also has an accelerometer 111 that determines the direction of tire rotation. Each tire also has a tire pressure sensor 113 that measures tire pressure. In one aspect, each monitor 115 includes a transmitter that transmits a signal (e.g., an RF message) including the sensed tire pressure (sensed by the sensor 113), the direction of rotation (determined by the accelerometer 111), a tire identifier (stored in the monitor 115), and possibly other information. In one example, RF messages are sent from the tire monitor 115 at predetermined intervals, e.g., every 16 or 32 seconds.

It will be appreciated that the rotational direction is as viewed from the perspective of the tire sensor on each of the tires. In this respect and for dualies, one tire (e.g., the outermost tire) is mounted normally on the axle. The other tire (e.g., the innermost tire) is turned so that its whitewall (i.e., the front of the tire) faces (is closest to) the vehicle.

For instance and as mentioned, the rear left dualie 108 has the inner tire 122 and an outer tire 120. From the perspective of the TPM sensor on each of these tires, as the vehicle 102 moves forward the outer tire 120 of the dualie rotates counterclockwise, and the inner tire 122 of the left dualie rotates clockwise. As for the right rear dualie 110 including the two tires 124 and 126, the inner tire 126 rotates counterclockwise and the outer tire 124 rotates clockwise.

A receiver 132 is disposed nearer the front tires and the receiver is configured to receive the RF signals sent from the tires. The receiver 132 receives the signal transmitted by the monitor 115 and determines the signal strength of the received signal.

In one example of the operation of the system of FIG. 1, one of the monitors at the tires transmits an ID of the tire and a direction of rotation of the tire in an RF message. Direction of tire rotation is determined by the accelerometer 111 that is also disposed on the tire. The receiver 132 receives the transmission, and extracts the ID and the direction of rotation of the tire. A determination of the RSSI of the message is also made. If RSSI is relatively high (e.g., above a predetermined threshold), a determination is made that the message is from one of the front tires. A check is then made as to direction of rotation. If the direction is counterclockwise, then a determination is made that the wheel is the left front tire. If the direction is clockwise, then the wheel is the front right tire. The ID received with the RF message is then associated with a tire position (front left or front right tire).

If the RSSI is relatively low or weak (e.g., below a predetermined threshold), then a determination is made that the message is from one of the rear tires of one of the dualies 108 and 110. A determination is made to see if the initiator has been activated (e.g., the initiator has been pulsed and a return RF message received within a predetermined time window). If the messaging occurred within window then, a determination is made that the message has been received from the left rear dualie since the LF indicator will not be sensed by right dualie. If the messaging does not occur within window, then a determination is made that the message is from the right dualie. The direction of rotation is then examined and a determination is made of whether the tire is the inner tire or the outer tire. For instance, if it is determined that the tire is on the left dualie and the direction is counterclockwise, then the tire is the outermost left rear tire. If it is determined that the tire is on the left dualie and the direction is clockwise, then the tire is the innermost left rear tire. If it is determined that the tire is on the right dualie and the direction is clockwise, then the tire is the outermost right rear tire. If it is determined that the tire is on the right dualie and the direction is counterclockwise, then the tire is the innermost right rear tire. The tire identifier in the message can then be associated with the tire position (in this case, left rear, outermost tire).

The above approach may then be repeated a predetermined number of times to ensure the results are consistent. If the results are consistent, then the tire ID of the message is at the identified position. The identified position includes front right, front left, left dualie inner, left dualie outer, right dualie inner, and right dualie outer.

As can be appreciated, the above-mentioned approach determines the position of each tire in the dualie arrangement. Advantageously, only one LF initiator is used thereby reducing the costs of the system since multiple LF initiators are typically expensive.

Figure 2:
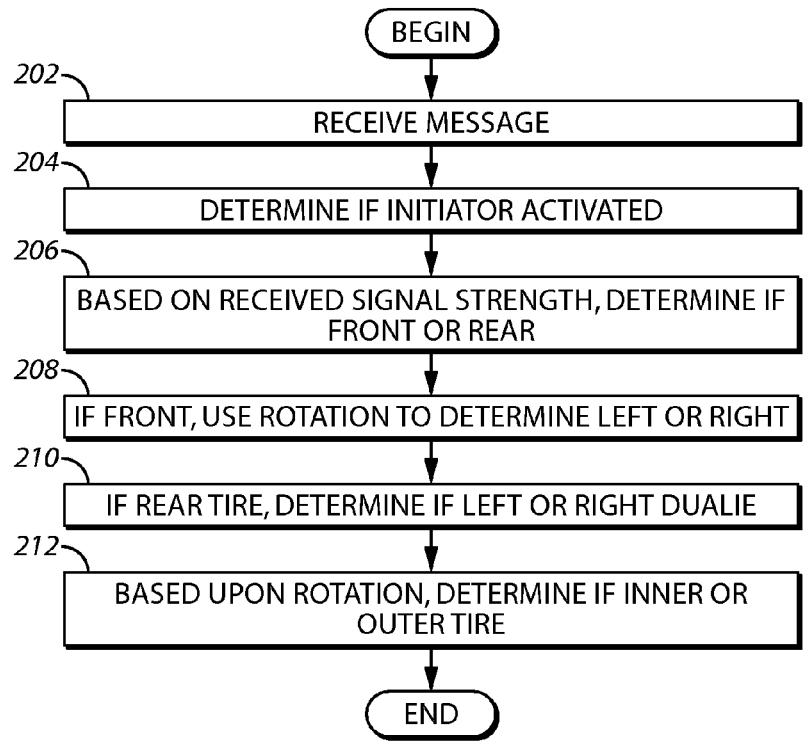
FIG. 2 comprises a flowchart of an approach for determining tire location according to various embodiments of the present invention.

Referring now to FIG. 2, one approach for determining the location of a tire pressure monitor is described. The tire pressure monitor is disposed at one of the tires on a vehicle equipped with dualies. At step 202, a message is received from a tire pressure monitor and the message has an associated received signal strength that can be determined by a receiver. The message also includes information indicating a direction of rotation of a tire and a tire identifier from the tire pressure monitor sensor. The tire pressure monitor is disposed at one of the tires of a vehicle equipped with dualies.

At step 204, a determination is made as to whether a wireless signal initiator has been activated and has transmitted an initiation signal. Based upon the received signal strength of the message, at step 206, a determination is made as to whether the tire is a front tire or rear tire, and when the tire is determined to be a front tire. If the receiver is disposed at the front portion of the vehicle, a relatively high signal strength indicates the signal is from a front tire (right or left) while a relatively weak or low signal strength indicates the signal is from one of the rear tires. At step 208, when the signal strength is high (indicating a front tire) a determination is made as to whether the tire is a left front tire or right front tire based upon the direction of rotation. For example, a counterclockwise direction indicates the signal as being received from the front left tire while a clockwise direction indicates the signal has been received from the front right tire.

At step 210, when the received signal strength indicates that the tire is a rear tire, and based upon whether the initiator has been activated and a response received, a determination is made as to whether it is a left rear tire of a left dualie or a right rear tire in a right dualie. In this respect and where the initiator is disposed near the left dualie, if the initiator has been activated and a response received within a time window, then the signal has been received from one of the tires of the left dualie. Otherwise, the signal has been received from the one of the tires of the right dualie.

Then, at step 212 and based upon direction of rotation a determination is made as to whether the tire is an outer tire of the dualie or an inner tire of the dualie. For instance, if it is determined that the tire is on the left dualie and the direction is counterclockwise, then the tire is the outermost left rear tire. If it is determined that the tire is on the left dualie and the direction is clockwise, then the tire is the innermost left rear tire. If it is determined that the tire is on the right dualie and the direction is clockwise, then the tire is the outermost right rear tire. If it is determined that the tire is on the right dualie and the direction is counterclockwise, then the tire is the innermost right rear tire.

In some aspects, the initiator is a low frequency (LF) initiator. In some aspects, the message comprises tire pressure information. In still other aspects, the tire pressure information is presented to a user. For instance, the information is presented on a graphical display.

Figure 3:
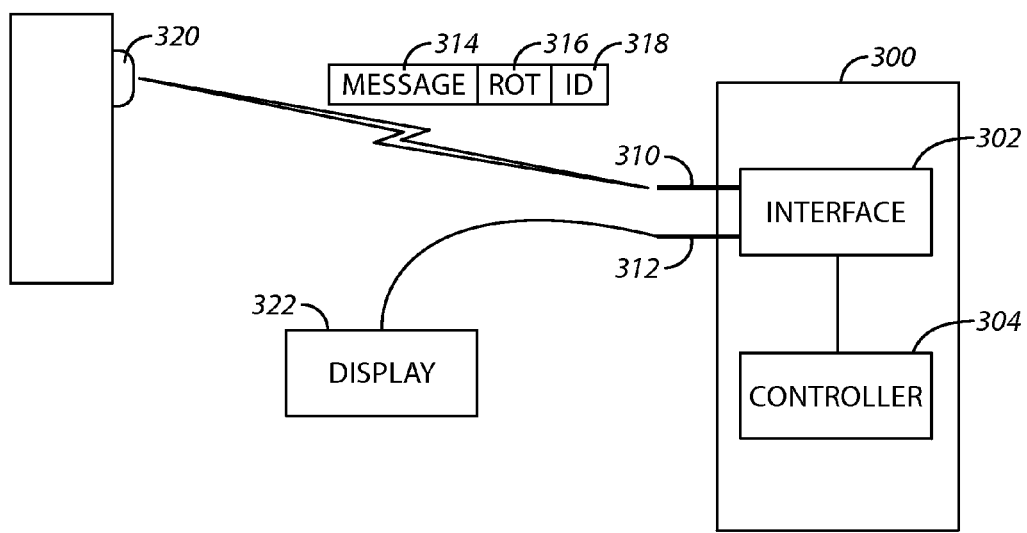
FIG. 3 comprises a block diagram of an apparatus for determining tire location according to various embodiments of the present invention.

Referring now to FIG. 3, an apparatus 300 that is configured to determine the location of a tire pressure monitor 320 is described. The tire pressure monitor 320 is disposed at one of the tires 322 on a vehicle equipped with dualies. The apparatus 300 includes an interface 302 and a controller 304.

The interface 302 has an input 310 and an output 312. The input 310 is configured to receive a message 314 from the tire pressure monitor 320. The message 314 has an associated received signal strength and includes information indicating a direction of rotation 316 of a tire and an tire identifier 318 from a tire pressure monitor 320. The tire pressure monitor 320 is disposed at one of the tires of a vehicle equipped with dualies.

The controller 304 is coupled to the interface 302 and is configured to determine whether a wireless signal initiator has been activated and has transmitted an initiation signal. The controller 304 is configured to, based upon the received signal strength of the message, determine whether the tire is a front tire or rear tire, and when the tire is determined to be a front tire, to determine whether the tire is a left front tire or right front tire based upon the direction of rotation. The controller 304 is further configured to when the received signal strength indicates that the tire is a rear tire, based upon whether the initiator has been activated, determine whether it is a left rear tire of a left dualie or a right rear tire in a right dualie, and then based upon direction of rotation, determine the tire is an outer tire of the dualie or an inner tire of the dualie. Examples of making these determinations have been described elsewhere herein.

Consequently, the tire ID of the received signal can be associated with a tire location. Information concerning a tire can be presented on an electronic display 322. For instance, once localization is complete, the display can indicate to a user that the outer tire of a left dualie is low on tire pressure.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of determining location of a tire pressure monitor, the tire pressure monitor being disposed at one of the tires on a vehicle equipped with dualies, the method comprising:
    activating a wireless signal initiator, the wireless signal initiator configured to transmit an initiation signal to be received at rear tires on a first side of the vehicle and not on a second side of the vehicle, the first and second sides being opposite lateral sides of the vehicle, the vehicle being equipped with only a single wireless signal initiator;
    receiving a message from a tire pressure monitor, the message having an associated received signal strength, the message including information indicating a direction of rotation of a tire and an tire identifier from a tire pressure monitor sensor;
    determining whether the wireless signal initiator has been activated and has transmitted the initiation signal;
    based upon the received signal strength of the message, determining whether the tire is a front tire or rear tire, and when the tire is determined to be a front tire, determining whether the tire is a left front tire or right front tire based upon the direction of rotation;
    when the received signal strength indicates that the tire is a rear tire, based upon whether the initiator has been activated and whether the message was received within a predetermined time period of at least one of the initiator activation and initiation signal transmission, determining whether the tire is in a dualie on the first side of the vehicle or in a dualie on the second side of the vehicle, and then based upon direction of rotation, determining whether the tire is an outer tire of the dualie or an inner tire of the dualie.

2. The method of claim 1 wherein the initiator is a low frequency (LF) initiator.

3. The method of claim 1 wherein the message comprises tire pressure information.

4. The method of claim 3 further comprising presenting the tire pressure information to a user.

5. The method of claim 4 wherein the information is presented on a graphical display.

6. The method of claim 3 further comprising determining whether the tire pressure is below a predetermined threshold.

7. The method of claim 1 further comprising associating a tire ID with an identified position upon repeating the receiving and determining a predetermined number of times.

8. The method of claim 7 wherein the identified position is a position selected from front right, front left, left dualie inner, left dualie outer, right dualie inner, and right dualie outer.

9. An apparatus that is configured to determine location of a tire pressure monitor, the tire pressure monitor being disposed at one of the tires on a vehicle equipped with dualies, the apparatus comprising:
 an interface having an input and an output, the input configured to receive a message from a tire pressure monitor, the message having an associated received signal strength, the message including information indicating a direction of rotation of a tire and an tire identifier from a tire pressure monitor sensor;
 a controller, the controller coupled to the interface, the controller configured to activate a wireless signal initiator, the wireless signal initiator configured to transmit an initiation signal configured to be received at rear tires on a first side of the vehicle and not on a second side of the vehicle, the first and second sides being opposite lateral sides of the vehicle, the vehicle being equipped with only a single wireless signal initiator, the controller further configured to determine whether the wireless signal initiator has been activated and has transmitted the initiation signal, the controller configured to, based upon the received signal strength of the message, determine whether the tire is a front tire or rear tire, and when the tire is determined to be a front tire, to determine whether the tire is a left front tire or right front tire based upon the direction of rotation, the controller being further configured to when the received signal strength indicates that the tire is a rear tire, based upon whether the initiator has been activated and whether the message was received within a predetermined time period of one at least one of the initiator activation and initiation signal transmission, determine whether the tire is in a dualie on the first side of the vehicle or in a dualie on the second side of the vehicle, and then based upon direction of rotation, determine whether the tire is an outer tire of the dualie or an inner tire of the dualie.

10. The apparatus of claim 9 wherein the initiator is a low frequency (LF) initiator.

11. The apparatus of claim 9 wherein the message comprises tire pressure information.

12. The apparatus of claim 11 wherein the controller is configured to present the tire pressure information to a user at the output of the interface.

13. The apparatus of claim 12 wherein the information is presented on a graphical display.

14. The apparatus of claim 11 wherein the controller is further configured to determine whether the tire pressure is below a predetermined threshold.

15. A non-transitory computer usable medium having a computer readable program code embodied therein, said computer readable program code adapted to be executed to implement a method of determining location of a tire pressure monitor, the method comprising:
 activating a wireless signal initiator, the wireless signal initiator configured to transmit an initiation signal to be received at rear tires on a first side of the vehicle and not on a second side of the vehicle, the first and second sides being opposite lateral sides of the vehicle, the vehicle being equipped with only a single wireless signal initiator;
 receiving a message from a tire pressure monitor, the message having an associated received signal strength, the message including information indicating a direction of rotation of a tire and an tire identifier from a tire pressure monitor sensor, the tire pressure monitor being disposed at one of the tires of a vehicle equipped with dualies;
 determining whether the wireless signal initiator has been activated and has transmitted the initiation signal;
 based upon the received signal strength of the message, determining whether the tire is a front tire or rear tire, and when the tire is determined to be a front tire, determining whether the tire is a left front tire or right front tire based upon the direction of rotation;
 when the received signal strength indicates that the tire is a rear tire, based upon whether the initiator has been activated and whether the message was received within a predetermined time period of one at least one of the initiator activation and initiation signal transmission, determining whether the tire is in a dualie on the first side of the vehicle or in a dualie on the second side of the vehicle, and then based upon direction of rotation, determining whether the tire is an outer tire of the dualie or an inner tire of the dualie.

16. The non-transitory computer usable medium of claim 15 wherein the initiator is a low frequency (LF) initiator.

17. The non-transitory computer usable medium of claim 15 wherein the message comprises tire pressure information.

18. The non-transitory computer usable medium of claim 17 further comprising presenting the tire pressure information to a user.

19. The non-transitory computer usable medium of claim 18 wherein the information is presented on a graphical display.

20. The non-transitory computer usable medium of claim 17 further comprising determining whether the tire pressure is below a predetermined threshold.

* * * * *